(12) United States Patent
Davis et al.

(10) Patent No.: US 7,295,201 B2
(45) Date of Patent: Nov. 13, 2007

(54) METHOD AND SYSTEM FOR GENERATING AUTOMATED EXPLODED VIEWS

(75) Inventors: Jonathan Earl Davis, Schenectady, NY (US); Jeanette Marie Bruno, Saratoga Springs, NY (US); Boris Yamrom, Bronx, NY (US)

(73) Assignee: General Electronic Company, Niskayuna, NY (US)

( * ) Notice: Subject to any disclaimer, the term of this patent is extended or adjusted under 35 U.S.C. 154(b) by 99 days.

(21) Appl. No.: 11/241,525

(22) Filed: Sep. 29, 2005

(65) Prior Publication Data

US 2007/0070073 A1   Mar. 29, 2007

(51) Int. Cl.
   *G06T 15/00*   (2006.01)
(52) U.S. Cl. .................... 345/419; 345/420; 703/2; 703/7; 703/22; 715/984
(58) Field of Classification Search ........ 345/419, 345/473–475, 420; 703/2, 7, 22; 715/964
   See application file for complete search history.

(56) References Cited

U.S. PATENT DOCUMENTS

| | | | |
|---|---|---|---|
| 5,282,140 A | 1/1994 | Tazawa et al. | 364/468 |
| 6,295,063 B1 | 9/2001 | Minami et al. | 345/419 |
| 6,725,184 B1 | 4/2004 | Gadh et al. | 703/2 |
| 6,826,500 B2 | 11/2004 | Linthicum et al. | 702/98 |
| 6,876,359 B2 * | 4/2005 | Minami et al. | 345/419 |
| 6,898,560 B1 * | 5/2005 | Das | 703/7 |
| 7,075,531 B1 * | 7/2006 | Ando et al. | 345/420 |
| 7,170,509 B2 * | 1/2007 | Tanaka et al. | 345/419 |
| 2003/0043177 A1 | 3/2003 | Kawai | 345/700 |
| 2003/0097195 A1 | 5/2003 | Yamrom et al. | 700/95 |

* cited by examiner

*Primary Examiner*—Phu K. Nguyen
(74) *Attorney, Agent, or Firm*—Fletcher Yoder

(57) ABSTRACT

A method for generating an automated exploded view of an assembly of parts is presented. The method includes determining at least one sequence of viable directions of motion of at least one moving part in the assembly of parts. Computer-readable medium and systems that afford functionality of the type defined by this method are also contemplated in conjunction with the present technique.

27 Claims, 9 Drawing Sheets

METHOD AND SYSTEM FOR GENERATING AUTOMATED EXPLODED VIEWS

BACKGROUND

The invention relates generally to computer-aided design of mechanical assemblies, and more particularly to computer implemented methods and systems for enabling automated generation of exploded view representations of three-dimensional part models to be used by field service personnel for maintenance and service of products or machines in the field.

Computer aided design (CAD) is increasingly becoming an indispensable tool in the creation of machinery and industrial tools. Conventionally, CAD facilitates creation of hard copies of various drawings of machine parts, as well as the ability to view and interact with three-dimensional (3D) representations directly on a computer display. Engineers and designers develop computer models of assemblies with the product intent in mind, and manufacturing or maintenance of the product is typically an afterthought. More recently, increasing attention has been given to generating specifications of assemblies and assembly sequences to be used in assembly of parts.

A major cost in the life cycle of a machine, product, or piece of equipment is the creation of service and maintenance instructions based on engineering data, as well as additional costs associated with the validation and verification of the instructions. Generally, assembly sequences are difficult to describe with static images. A desirable alternative is the development of 3D motion paths. The generation of 3D motion paths has been accomplished, for example, by creation of animation sequences that depict the process of assembly. However, for large assemblies, this is generally a daunting task. Exploded assemblies are used instead to communicate, in static images, the various spatial interrelations between various parts in the assembly to the manufacturing community responsible for assembling the product and the service personnel responsible for servicing and part replacement. These images advantageously aid in the initial assembly of machinery and also in future repair and maintenance. Currently, these images are produced manually by skilled draftspersons and are limited to small and medium size assemblies.

Accordingly, there is a need for a robust computer implemented method for generating disassembly sequences from geometric models for use in field for service, maintenance, and training of field service personnel.

BRIEF DESCRIPTION

Briefly, in accordance with aspects of the present technique, a method for generating an automated exploded view of an assembly of parts is presented. The method includes determining at least one sequence of viable directions of motion of at least one moving part in the assembly of parts. Computer-readable medium and systems that afford functionality of the type defined by this method are also contemplated in conjunction with the present technique.

In accordance with another aspect of the present technique, a method for generating an automated exploded view of an assembly of parts is presented. The method includes selecting a moving part from an assembly of parts, where the moving part includes one or more points. Furthermore, the method includes selecting a stationary part from the assembly of parts, wherein the stationary part is different from the moving part, and wherein the stationary part includes one or more polygons. In addition, the method includes computing a shadow cast by the each of the one or more polygons on a spherical plane with respect to each point in the moving part. The method also includes generating a masked array for each point on the moving part, wherein the masked array represents directions of motion of the moving part. Computer-readable medium and systems that afford functionality of the type defined by this method are also contemplated in conjunction with the present technique.

In accordance with yet another aspect of the present technique, a system is presented. The system includes one or more tangible media; and code disposed on the tangible media, where the code is adapted to determine at least one sequence of viable directions of motion of at least one moving part in an assembly of parts.

In accordance with further aspects of the present technique, a system is presented. The system includes one or more tangible media and code disposed on the tangible media, where the code includes code adapted to select a moving part from an assembly of parts, wherein the moving part comprises one or more points, code further adapted to select a stationary part from the assembly of parts, wherein the stationary part is different from the moving part, and wherein the stationary part comprises one or more polygons, code further adapted to compute a shadow cast by the each of the one or more polygons on a spherical plane with respect to each point in the moving part and code further adapted to generate a masked array for each point in the stationary part, wherein the masked array represents directions of motion of the stationary part.

In accordance with further aspects of the present technique, a system for generating an automated exploded view of an assembly of parts. The system includes a pre-processor module configured to select a configured to select a moving part from the assembly of parts, further configured to create shadow masked array for a selected moving part, wherein the shadow masked array comprises one or more points, wherein each of the one or more points represents a direction of motion of the moving part with respect to the center of the assembly, and further configured to select a stationary part different from the moving part. The system also includes a processing module configured to select a first point on the moving part having one or more points, further configured to select a first polygon on the stationary part having one or more polygons, further configured to compute a shadow cast by each of the one or more polygons on a spherical plane with respect to the moving part, further configured to generate a masked array for each point in the moving part, wherein the masked array represents directions of motion of the moving part, and further configured to select an explosion direction for the moving part from the masked array, wherein the explosion direction comprises a direction of unimpeded motion of the moving part with respect to the assembly of parts.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
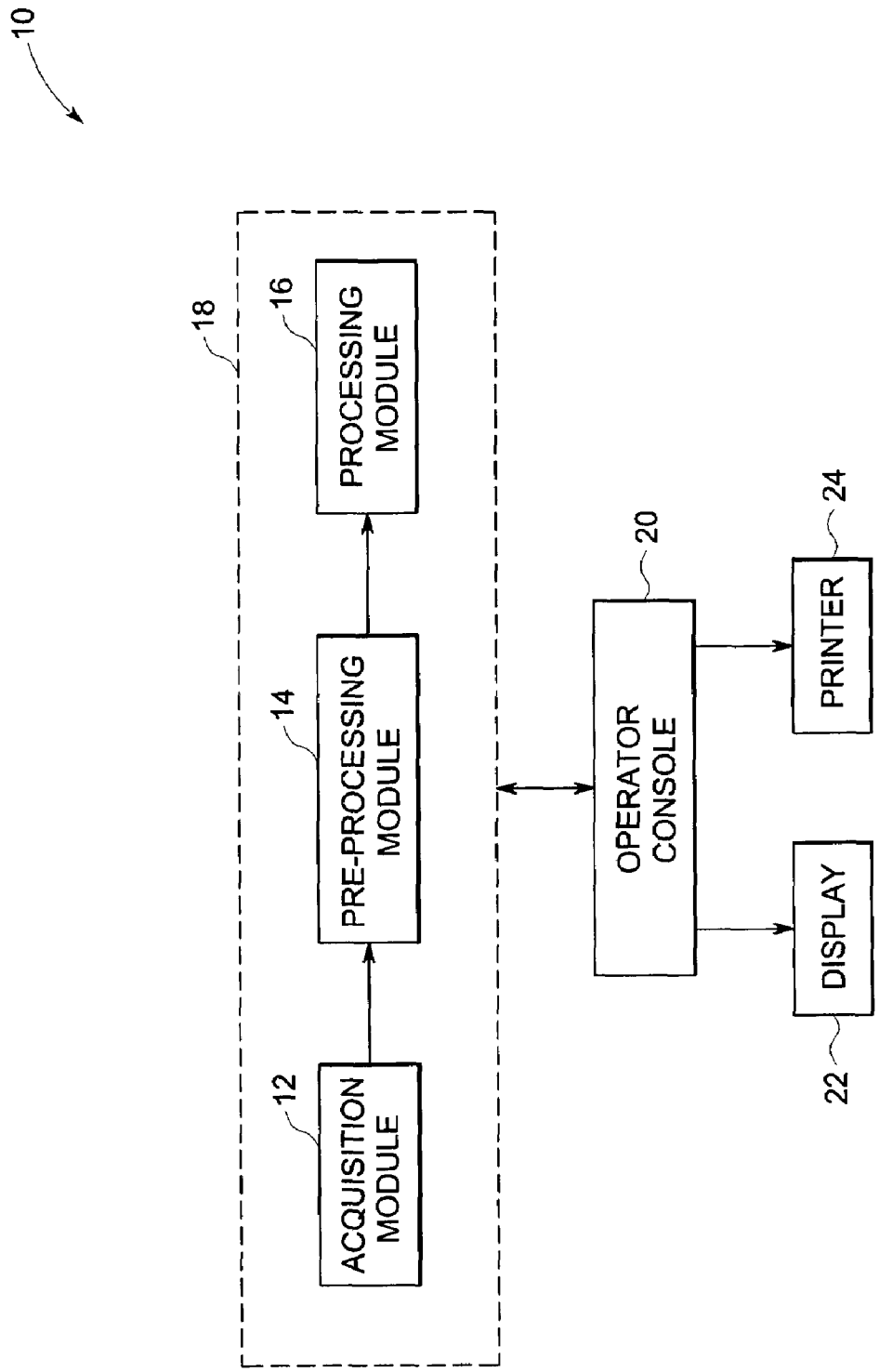
FIG. 1 is a block diagram of an exemplary system for use in generating an automated exploded view of an assembly of parts in accordance with aspects of the present technique.

FIG. 1 is a block diagram of an exemplary system 10 for use in generating an automated exploded view of an assembly of parts in accordance with aspects of the present technique. As will be appreciated by one skilled in the art, an exploded view is a pictorial illustration of components of an assembly of parts in which the various components are displaced or projected outwardly from their actual positions to show the sequence and relationship between the various components of the assembly of parts. As discussed below, embodiments of the present technique automatically compute an optimal explosion of parts to facilitate assembly and disassembly of parts. In other words, the optimal explosion may have the least likelihood of collision or interference between parts during assembly and disassembly. For example, the disclosed embodiments may employ computer implemented algorithms to calculate a plurality of possible paths of exploding each part relative to another part or plurality of parts in the assembly, and then identify an optimal path in the overall scheme of assembly and disassembly.

The system 10 may be configured to acquire information related to an assembly of parts via an acquisition module 12. While information regarding the assembly of parts may be directly acquired, the acquisition module 12 may instead acquire stored information regarding the assembly of parts from an archive site or data storage facility. For example, the acquisition module 12 may acquire dimensions, three-dimensional coordinates, material information, rigidity or flexibility of parts (e.g., degree of flexibility in dimensions of rubber seal, o-ring, etc.), axis of rotation of certain parts, identity of fixed or moving parts, and so forth. In certain embodiments, the acquisition module 12 may acquire or intake data in the form of a computer aided design (CAD) and/or computer aided manufacture (CAM) design model, such as produced by a convention CAD/CAM system. In addition, the acquisition module 12 may also be configured to obtain information regarding tessellation of each of the parts in the assembly of parts. For example, each of the parts in the assembly of parts may be tessellated into a plurality of polygons, where each of the plurality of polygons may include a triangle.

The system 10 may include a pre-processing module 14 that may be configured to process the information regarding the assembly of parts acquired by the acquisition module 12. The pre-processing module 14 may facilitate processing the part information prior to the any further processing downstream. For example, the pre-processing module 14 may be configured to select a first part from the assembly of parts. The pre-processing module 14 may also be configured to create an array of integers for a selected first part. In addition, the pre-processing module 14 may also facilitate selection of a second part different from the first part, where the first part is a moving part and the second part is a stationary part. The functioning of the pre-processing module 14 will be described in greater detail with reference to FIGS. 3-5.

Furthermore, the system 10 may include a processing module 16 that may be configured to generate an exploded view of the assembly of parts. Accordingly, the processing module 16 may be configured to select a first point on the moving part having one or more points. Additionally, the processing module 16 may also be configured to select a first polygon on the stationary part having one or more polygons. Further, the processing module 16 may aid in the computation of a shadow cast by each of the one or more polygons on a spherical plane with respect to the moving part. Additionally, the processing module 16 may facilitate generation of a masked array for each point in the moving part, where the masked array represents directions of motion of the moving part. The processing module 16 may be further configured to select an explosion direction for the moving part from the masked array, wherein the explosion direction comprises a direction of substantially unimpeded motion of the moving part with respect to the assembly of parts. The functioning of the processing module 16 will be described in greater detail with reference to FIGS. 3-9.

The various modules and processing components, such as acquisition module 12, pre-processing module 14 and the processing module 16 may constitute an acquisition and processing system 18 that may be accessed and/or operated via an operator console 20. The operator console 20 may also be employed to facilitate the display of the exploded view of the assembly of parts, such as on a display 22 and/or a printer 24. For example, an operator may use the operator console 20 to designate the manner in which exploded views are displayed.

Figure 2:
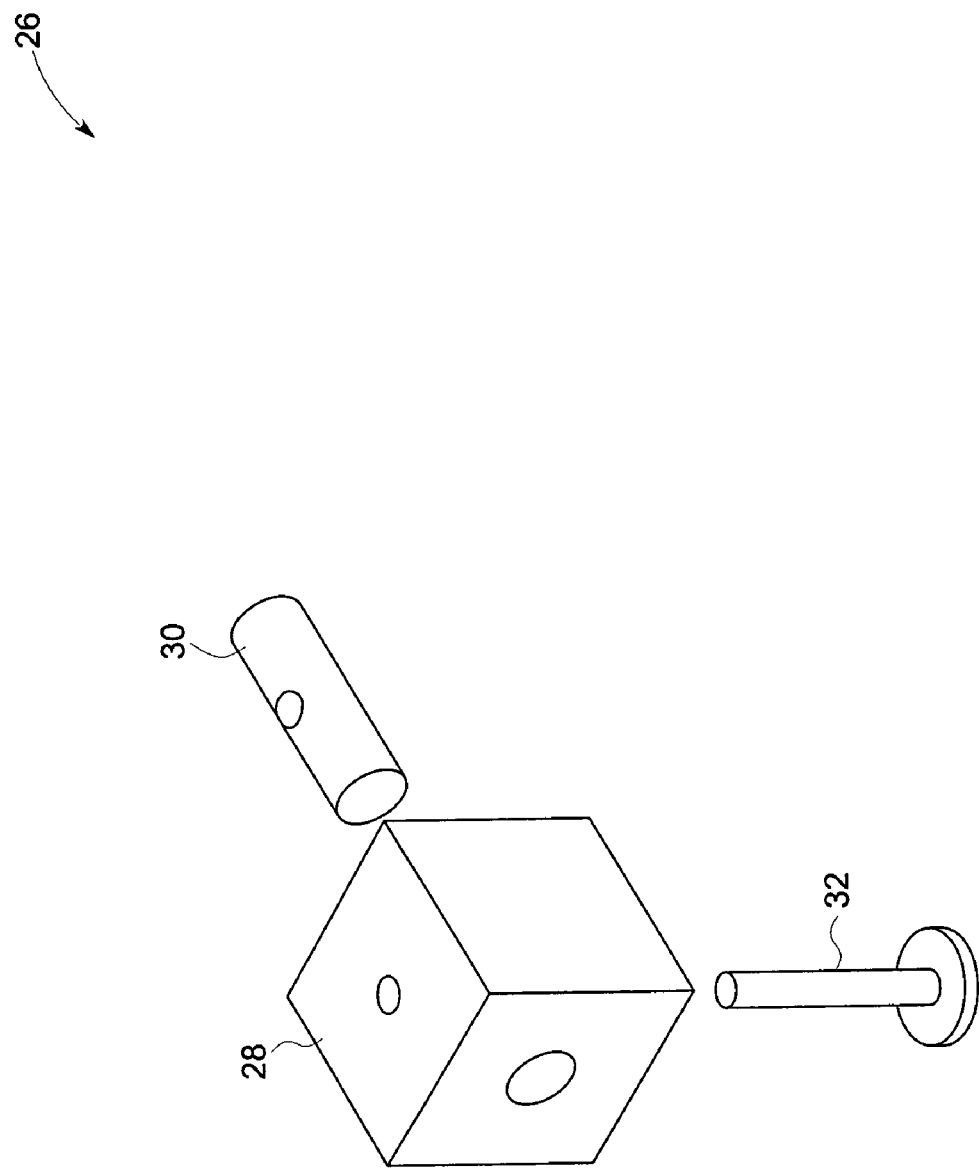
FIG. 2 is a diagrammatical illustration of an assembly of parts.

Referring now to FIG. 2, a diagram of an assembly of parts 26 is illustrated. In the illustration depicted in FIG. 2, the assembly of parts 26 is shown as having first part 28, a second part 30 and a third part 32. Further, the assembly of parts 26 is illustrated with its parts 28, 30, 32 separated but drawn in relation to each other. In accordance with exemplary aspects of the present invention, a method for generating an exploded view of the assembly of parts 26 utilizing directions of unhindered motion of the parts of the assembly 26 may be determined. For example, it may be desirable to determine the directions of unhindered motion of the second part 30 with respect to each of the first and third parts 28, 32. As can be seen from FIG. 2, the second part 30 may be moved in two directions with respect to the first part 28. However, the movement of the second part 30 is restricted by the third part 32. Hence, the second part 30 is constrained to move in one of two directions with respect to the first and third parts 28, 32. In a similar fashion, the third part 32 is constrained to move in one direction with respect to the first and second parts 28, 30. The computation of the directions of substantially unhindered motion of the various parts of a given assembly will be described in greater detail with respect to FIGS. 3-9.

Figure 3:
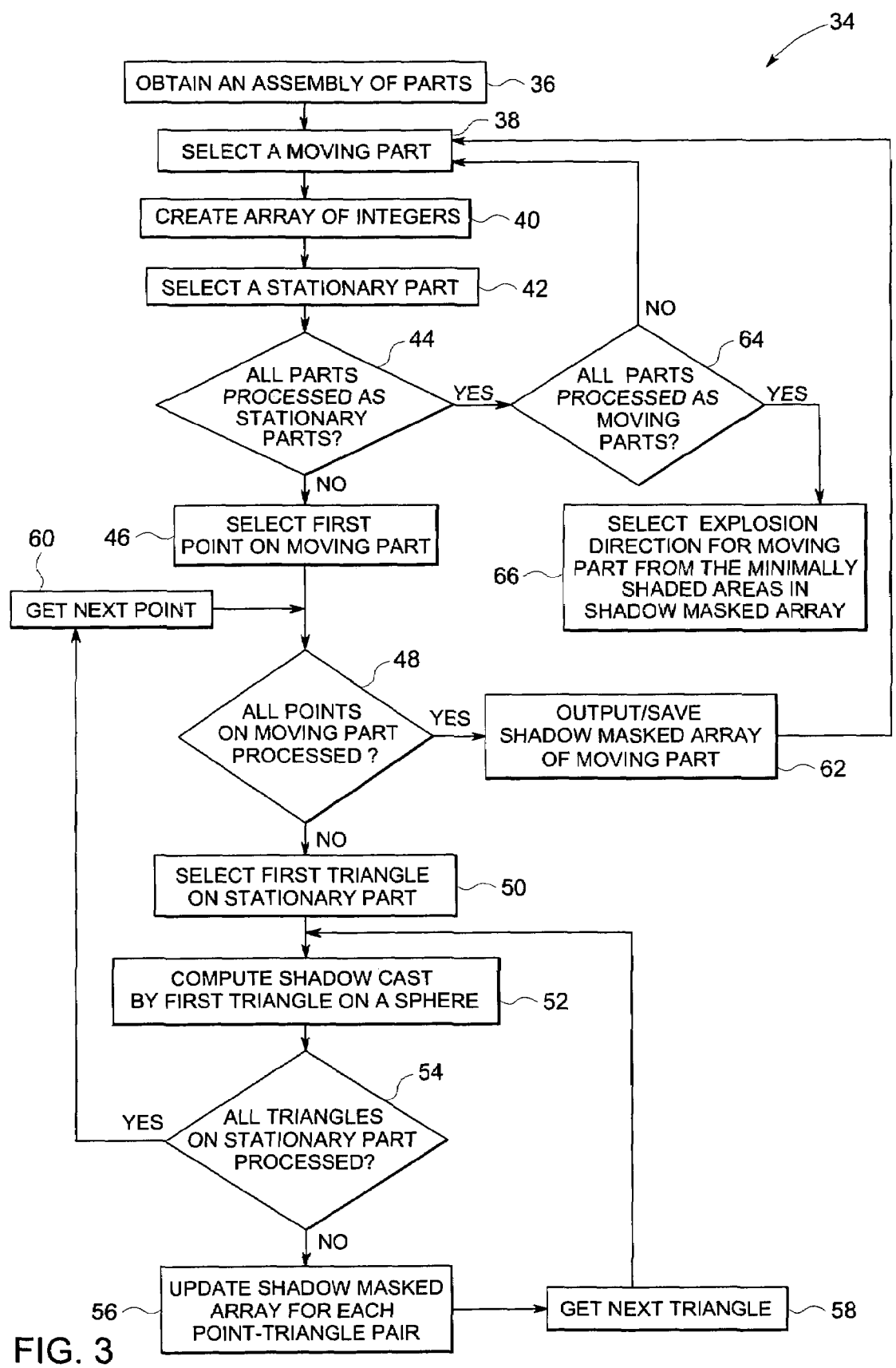
FIG. 3 is a flowchart illustrating a method for generating an automated exploded view of an assembly of parts, such as illustrated in FIG. 2, in accordance with aspects of the present technique.

FIG. 3 is a flowchart of exemplary logic 34 for generating an automated exploded view of an assembly of parts, such as the assembly of parts 26 illustrated in FIG. 2. In accordance with exemplary aspects of the present technique, a method for generating an automated exploded view of an assembly of parts is presented. The method includes determining at least one sequence of viable directions of motion of at least one moving part in the assembly of parts. The method starts at step 36 by obtaining an assembly of parts, such as the assembly of parts 26 (see FIG. 2). The assembly of parts 26 may be obtained from a computer aided design (CAD) model, for example.

In addition, at step 38, a part is selected as the moving part from the assembly of parts. As used herein, the "moving" part is representative of a part selected for removal, insertion, and/or replacement relative to the assembly of parts. Further, as used herein, a "viable" direction of motion of the moving part includes a direction of motion where generally no collisions with the other parts of the assembly are generated when the moving part is removed, inserted and/or replaced from the assembly of parts. Also, the terms first part and moving part may be used interchangeably. It should be noted that at step 38 a part that has previously not been selected as a moving part is selected. This selected moving part may be made up of one or more points defining a set of polygons embodying the exterior surface of the moving part. It may be noted that in light of the selection of the moving part, the other non-moving parts in the assembly of parts may be referred to as stationary parts. It is now desirable to establish viable directions of motion of the selected moving part. Subsequently, at step 40, an array of integers is created and the values in the array are initialized to zero. Further, this array of integers may be configured to embody the spherical coordinate space, where each point in the array represents a vector direction based on values of theta ($\theta$) and phi ($\phi$) as per the definition of spherical coordinates. Additionally, the size of the array of integers may be determined by the number of vector directions employed in the analysis. In accordance with aspects of the present technique, the array of integers is a two dimensional array indexed on the theta ($\theta$) and phi ($\phi$) values. As such, each ($\theta$, $\phi$) index is representative of a direction of motion of the moving part.

At step 42, a stationary part may be selected. According to aspects of the present technique, the stationary part is different from the moving part. As used herein, the "stationary" part is representative of a part of the assembly of parts that is not currently selected for removal, insertion, and/or replacement. Also, the terms second part and stationary part may be used interchangeably.

In addition, it is desirable to select the stationary part such that the currently selected stationary part has not been processed with respect to the moving part. Accordingly, as indicated by step 44, a check is made to verify whether the selected stationary part has been processed with respect to the moving part. In the event that the selected stationary part has not been previously processed with respect to the moving part, viable directions of motion of the moving part with respect to the selected stationary part are identified starting at step 46. In other words, the stationary part is processed with respect to the moving part to generate one or more viable directions of motion of the moving part with respect to the selected stationary part.

As previously noted, the moving part is described as being made up of one or more points. At step 46, a first point is selected on the moving part. As previously noted, information regarding the tessellation of each of the parts in the assembly of parts may be acquired via the acquisition module 12 (see FIG. 1), for example. In a presently contemplated configuration, the stationary part may be tessellated into one or more triangles. However, as will be appreciated, the stationary part may be tessellated into one or more polygons such as a square, a rectangle, a rhombus, or combinations thereof. Subsequently, at step 48, a check is made to verify whether each of the one or more points on the moving part has been processed.

Following step 48, a first triangle on the tessellated stationary part may be selected at step 50. Subsequently, at step 52, a shadow cast by the first triangle on a sphere with respect to the selected first point on the moving part may be computed. It may be noted that the sphere is external to the assembly of parts. The computation of the shadow at step 52 will be described in greater detail with reference to FIGS. 4-9. Further, as indicated by step 54, a check is carried out to verify whether the shadows cast by each of the one or more triangles on the stationary part with respect to the first point on the moving part have been computed. Accordingly, the array of integers generated at step 40, also referred to as a shadow masked array for a pair including the first point on the moving part and the first triangle on the stationary part is updated at step 56. It should be noted that the terms array of integers and shadow masked array may be used interchangeably. As previously discussed, the shadow masked array is representative of the directions of motion of the moving part with respect to the assembly of parts. The process of updating the shadow masked array at step 56 will be described in greater detail with reference to FIGS. 5-9.

Subsequently, at step 58, the next triangle of the one or more triangles on the stationary part is selected. Steps 52-58 are repeated until all the triangles on the stationary part have been processed with respect to the first point on the moving part. In other words, steps 52-58 are repeated until shadows cast by each of the one or more triangles onto the sphere with respect to the first point on the moving part are computed.

Further, with returning reference to the decision block at step 54, if all of the one or more triangles on the stationary part have been processed with respect to the first point on the moving part, the next of the one or more points on the moving part is selected at step 60. Steps 48-58 are repeated for the next selected point. Additionally, steps 48-60 are repeated until the shadows cast by each of the one or more triangles on the stationary part have been computed with respect to each of the one or more points on the moving part. Moreover, with returning reference to the decision block at step 48, if all of the one or more points on the moving part have been processed, the masked array for the moving part may be output and/or saved at step 62. Following step 62, another part from the assembly of parts that has not been previously processed as a moving may be selected as the moving part and steps 38-62 may be repeated as described hereinabove.

It may be noted that the shadow masked array output at step 62 is a composite shadow masked array. In one embodiment, the composite shadow masked array may be obtained by overlaying the shadow masked array generated for each point on the moving part over one another. In one embodiment, the composite shadow masked array may be representative of a grayscale image. Furthermore, each point in the composite shadow masked array is representative of a union of part blocking information for a given direction of motion. The union of part blocking information embodies information regarding blocking of the moving part by any other part in the assembly in the direction of motion represented by the respective point in the composite shadow masked array.

Returning to the decision block at step 44, if each of the stationary parts in the assembly of parts has been processed with respect to the selected moving part, a check is carried out at step 64 to verify whether all of the parts in the assembly of parts have been selected as moving parts and processed with respect to the other parts in the assembly of parts. If all of the parts in the assembly of parts have not been processed as moving parts, steps 38-62 are repeated until all of the parts of the assembly of parts have been selected as moving parts and processed with respect to all the stationary parts in the assembly of parts. Further, if all of the parts in the assembly of parts have been selected and processed as moving parts, the directions of substantially unhindered motion may be identified from the respective shadow masked array at step 66. In accordance with aspects of the present technique, for each moving part, an associated shadow masked array is generated. As previously noted, in certain embodiments, the shadow masked array may be a grayscale image. Accordingly, the explosion directions or the directions of unhindered motion for a given moving part may be identified from the associated shadow masked array representative of a grayscale image. It should be noted that the terms shadow masked array and grayscale image may be used interchangeably. Minimally shaded areas of the respective grayscale image may be representative of the directions of substantially unhindered motion. The darkly shaded areas of the grayscale image may be representative of the directions of substantially blocked motion.

Figure 4:
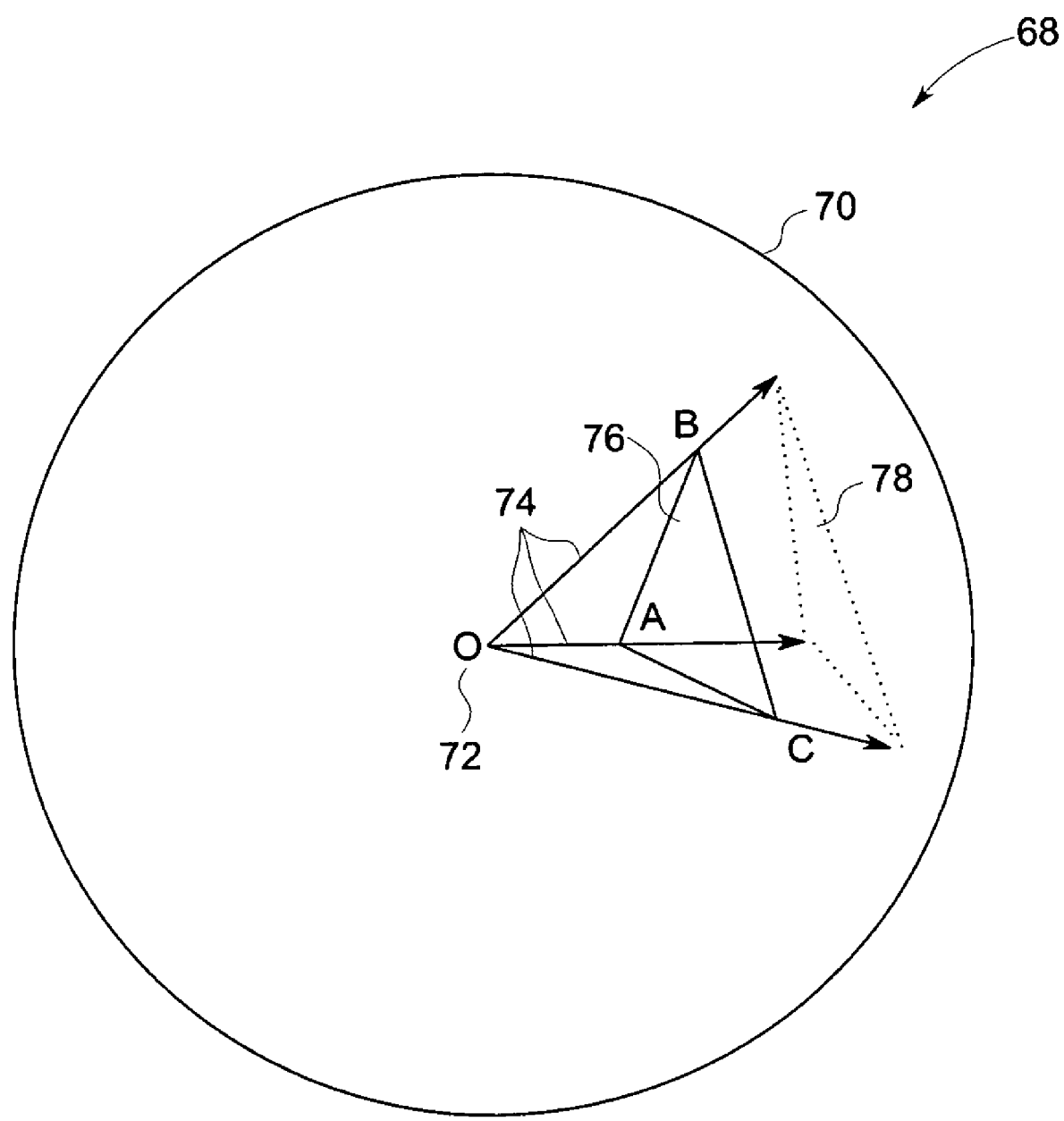
FIG. 4 is an illustration of a mechanism for computing shadows in an assembly of parts in accordance with aspects of the present technique.

Steps 36-66 may be better understood with reference to FIG. 4. Reference numeral 68 is representative of an illustration of the exemplary method of computing shadows in accordance with aspects of the present technique. As previously noted, a sphere 70 external to the assembly of parts, such as the assembly of parts 26 (see FIG. 2) is employed in the computation of shadows cast. Point O, numbered as 72, is representative of a point on the selected moving part. Triangle ABC, numbered as 76, is representative of one of the triangles on the tessellated stationary part. In accordance with aspects of the present technique, for a given point O 72 on the moving part and a given polygon on the stationary part, such as triangle ABC 76 with vertices A, B, and C, vectors such as vectors OA, OB and OC 74 may be defined. It may be noted that these vectors, OA, OB and OC 74 are defined in the Cartesian coordinate space. Further, reference numeral 78 is representative of a shadow cast onto the sphere 70 by the triangle 76 with respect to the point O 72 on the moving part. Further, a shadow masked array is generated for the computed shadow. The process is repeated until all the triangles on the selected stationary part have been processed with respect to the point O 72 on the moving part. In other words, a shadow masked array is generated and updated as the shadow cast by each of the one or more triangles on the stationary part with respect to the selected point on the moving part is computed.

Once the shadows cast by each of the one or more triangles on the stationary part have been computed and the shadow masked array has been updated, a second point on the moving part is selected and the steps of computing the shadow cast by each of the one or more triangles with respect to the selected second point is repeated and the associated shadow masked array is updated. Further, once all of the points on the moving part have been respectively processed with each of the one or more triangles on the stationary part, the composite shadow masked array associated with the selected moving part is output and/or saved.

Subsequently, another part in the assembly of parts, that has not been previously selected, is selected as the moving part. The previously described process of computing the shadow and updating the shadow masked array is then repeated for a second moving part. It may be noted that the process is repeated until each of the parts in the assembly of parts has been processed and a respective shadow masked array has been generated.

The viable directions of motion of each of the parts in the assembly of parts may then be obtained from the respective shadow masked arrays. As previously discussed, a composite shadow masked array representative of a grayscale image is generated by overlaying the shadow masked array generated for each point on the moving part over one another. As previously noted, the terms shadow masked array and grayscale image may be used interchangeably. A minimally shaded region in the grayscale image embodies a direction of generally unhindered motion, while a darkly shaded region in the grayscale image is representative of directions of generally blocked motion.

Figure 5:
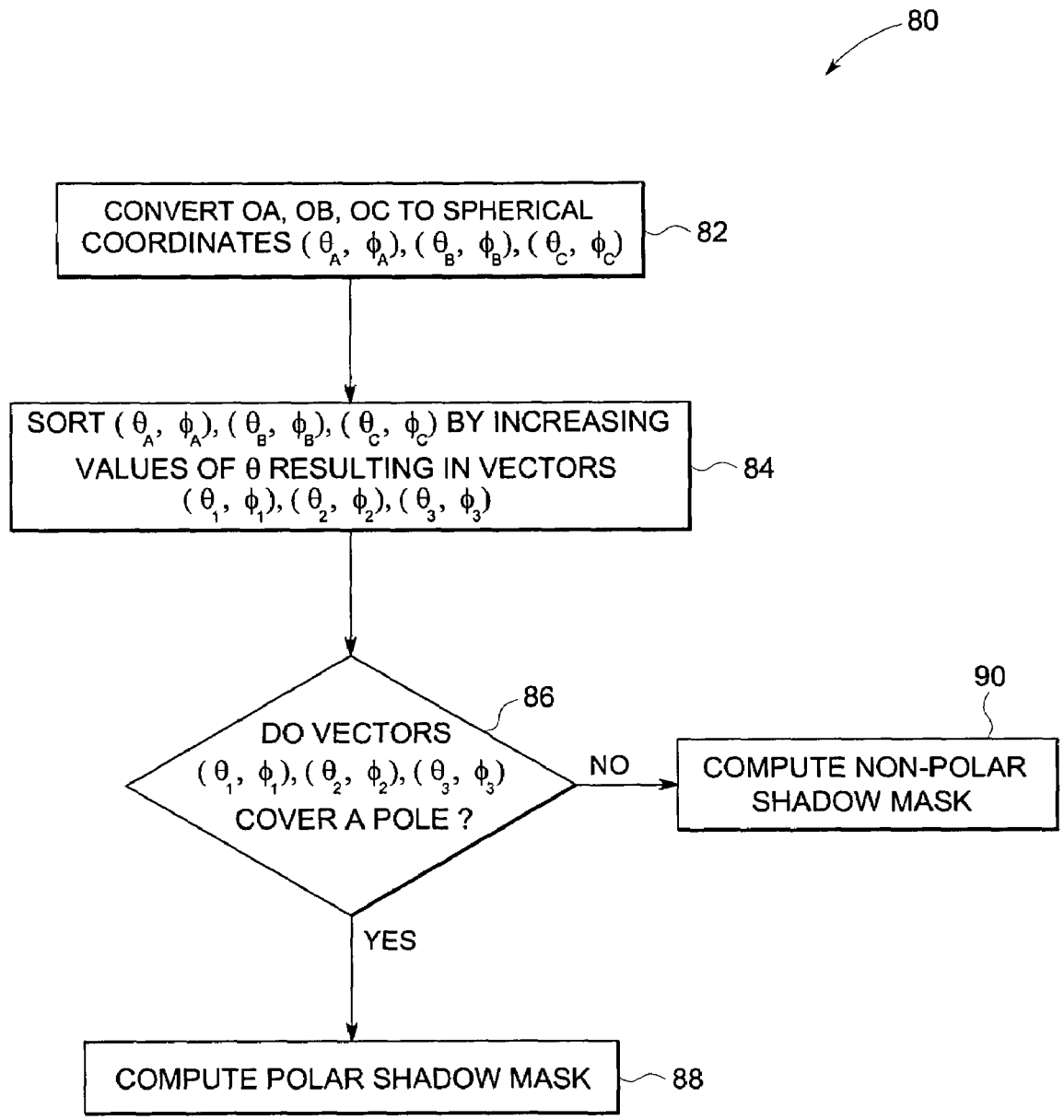
FIG. 5 is a flowchart illustrating a method for computing shadows in an assembly of parts for use in the method depicted in FIG. 3 in accordance with aspects of the present technique.

Turning now to FIG. 5, a flowchart depicting exemplary computer implemented logic 80 for computing and/or updating the shadow masked array, such as illustrated in FIG. 4 and at step 56 of FIG. 3 is illustrated. As previously noted, a shadow masked array representative of an array of integers is generated and the entries in the array are initialized to zero. Further, in one embodiment, the size of the array may be defined as ($360/\Delta$, $180/\Delta$), where $\Delta$ is representative of a granularity of the shadow masked array. For example, the array granularity $\Delta$ may be 5 degrees. However, as will be appreciated, other values of array granularity $\Delta$ may be envisioned.

The method starts at step 82, where for each point-triangle pair including a point, such as point O 72 (see FIG. 4) on the moving part, and triangle ABC 76 (see FIG. 4) on the selected stationary part, vectors defined in the Cartesian coordinate space are converted to corresponding vectors in the spherical coordinate space. For example, the vectors OA, OB and OC 74 (see FIG. 4) defined in the Cartesian coordinate space are converted to spherical coordinates. Accordingly, the vectors OA, OB and OC 74 may now be represented by their respective spherical coordinates ($\theta_A$, $\phi_A$), ($\theta_B$, $\phi_B$), and ($\theta_C$, $\phi_C$). It should be noted that the radius component of the spherical coordinate system is assumed to be constant as the radius of the sphere 70 (see FIG. 4) is constant.

Subsequently, at step 84, the three vector pairs ($\theta_A$, $\phi_A$), ($\theta_B$, $\phi_B$), and ($\theta_C$, $\phi_C$) may be sorted by increasing values of $\theta$. The resulting vectors may be denoted as ($\theta_1$, $\phi_1$), ($\theta_2$, $\phi_2$), and ($\theta_3$, $\phi_3$). These three vectors ($\theta_1$, $\phi_1$), ($\theta_2$, $\phi_2$), and ($\theta_3$, $\phi_3$) are configured to define the vertices of a shape on the spherical surface occluded by the polygon with respect to the point on the moving part. In a presently contemplated configuration, these vectors define the vertices of a "triangular" mask on the surface of the sphere 70. The process of sorting the three vector pairs ($\theta_A$, $\phi_A$), ($\theta_B$, $\phi_B$), and ($\theta_C$, $\phi_C$) will be defined in greater detail with reference to FIG. 6.

Furthermore, at step 86, a check is carried out to verify whether the three vector pairs ($\theta_A$, $\phi_A$), ($\theta_B$, $\phi_B$), and ($\theta_C$, $\phi_C$) cover one of the pole regions. As will be appreciated, the pole regions may be described as regions where $\phi = -90$ and $\theta = +90$. Accordingly, at step 86 a check is carried out to verify whether one of the poles is located within a boundary of the shadow. It should be noted that if the three vector pairs ($\theta_A$, $\phi_A$), ($\theta_B$, $\phi_B$) and ($\theta_C$, $\phi_C$) cover a pole, additional computations may be necessary. The process of determining whether the three vector pairs $(\theta_A,\phi_A)$, $(\theta_B,\phi_B)$, and $(\theta_C,\phi_C)$ cover a pole will be described in greater detail with reference to FIG. 7.

At step 86, if it is determined that the three vector pairs $(\theta_A,\phi_A)$, $(\theta_B,\phi_B)$, and $(\theta_C,\phi_C)$ cover a pole, then a "polar" computation is employed to update the shadow masked array at step 88. However, at step 86, if it is established that the three $(\theta_A,\phi_A)$, $(\theta_B,\phi_B)$, and $(\theta_C,\phi_C)$ do not cover a pole, then a "non-polar" computation is utilized to update the shadow masked array at step 90. The methods of polar computation and non-polar computation will be described in greater detail with reference to FIG. 8 and FIG. 9 respectively.

Figure 6:
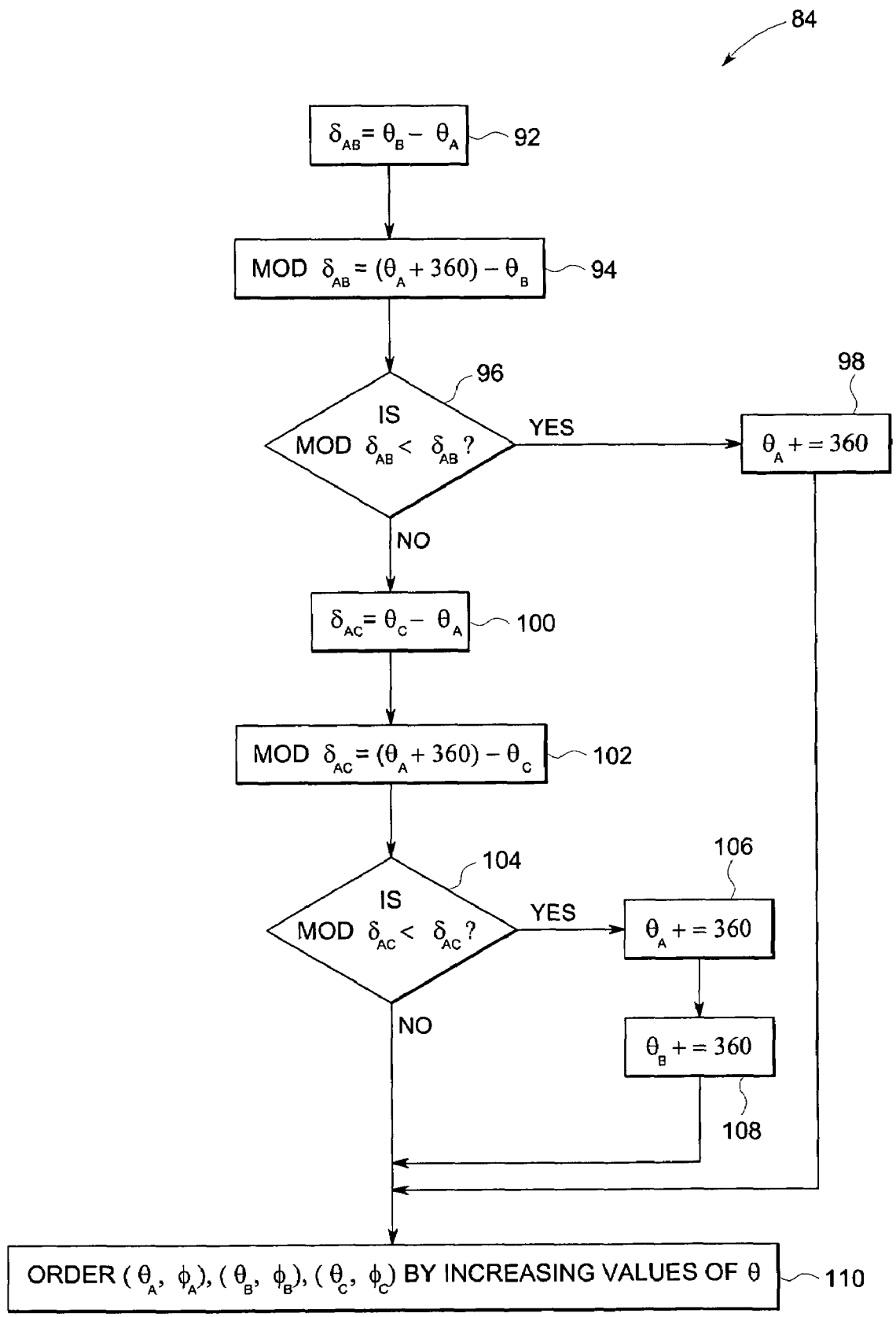
FIG. 6 is a flowchart illustrating a method for sorting for use in the method depicted in FIG. 5 in accordance with aspects of the present technique.

Referring now to FIG. 6, a flowchart illustrating logic 84 (see FIG. 5) for a method of sorting the three vector pairs $(\theta_A,\phi_A)$, $(\theta_B,\phi_B)$, and $(\theta_C,\phi_C)$ by increasing values of $\theta$ is depicted. In one embodiment, it may be assumed that $\theta_A<\theta_B<\theta_C$. The method starts at step 92 where a difference $\delta_{AB}$ between the values of $\theta_A$ and $\theta_B$ is computed as:

$$\delta_{AB}=\theta_B-\theta_A. \quad (1)$$

It should be noted that in certain situations the triangle occluded by the three vector pairs $(\theta_A,\phi_A)$, $(\theta_B,\phi_B)$, and $(\theta_C,\phi_C)$ may cross the zero-crossing boundary and wrap around the back of the sphere 70 (see FIG. 4). As will be appreciated, the zero-crossing boundary refers to a reference of the array for which the value of $\theta$ is zero (0). Further, due to the planar nature of a triangle occluded by the three vector pairs $(\theta_A,\phi_A)$, $(\theta_B,\phi_B)$, and $(\theta_C,\phi_C)$, a maximum of 180 degrees of the sphere 70 may be occluded by the triangle. Accordingly, if the triangle crosses the zero-crossing boundary in the spherical coordinate space, the value of the $\theta$ angles of all the points may be adjusted by a modulus of 360 degrees to ensure that all the points are located in the same relative space. Hence, the modulus operation (i.e., computation of the mod $\delta_{AB}$ value) may be configured to facilitate correcting the wrapping around of the triangle and ensuring that all the points are in the same relative coordinate space. Accordingly, at step 94, a modulus of the difference between the values of $\theta_A$ and $\theta_B$, mod $\delta_{AB}$, may be computed as:

$$\mathrm{mod}\delta_{AB}=(\theta_A+360)-\theta_B. \quad (2)$$

Subsequently, a check is carried out at step 96 to verify whether the value of mod $\delta_{AB}$ is less than the value of $\delta_{AB}$. If the value of mod $\delta_{AB}$ is less than that of $\delta_{AB}$, then a zero-crossing boundary is located such that $\theta_A$ is situated to the right of the zero-crossing boundary, while $\theta_B$ and $\theta_C$ are positioned to the left of the zero-crossing boundary. In other words, the triangle occluded by the three vector pairs $(\theta_A,\phi_A)$, $(\theta_B,\phi_B)$, and $(\theta_C,\phi_C)$ "crosses" the zero-crossing boundary. Accordingly, the value of $\theta_A$ may be adjusted by about 360 degrees at step 98 as follows:

$$\theta_A=\theta_A+360 \quad (3)$$

Subsequently, at step 110 the values of the three vector pairs $(\theta_A,\phi_A)$, $(\theta_B,\phi_B)$, and $(\theta_C,\phi_C)$ may be sorted by increasing values of $\theta$, resulting in vector pairs that may be denoted as $(\theta_1,\phi_1)$, $(\theta_2,\phi_2)$, and $(\theta_3,\phi_3)$.

However, at step 96, if the value of mod $\delta_{AB}$ is greater than that of $\delta_{AB}$, then at step 100 a difference $\delta_{AC}$ between the values of $\theta_A$ and $\theta_C$ is computed as:

$$\delta_{AC}=\theta_C-\theta_A. \quad (4)$$

Additionally, at step 102, a modulus of the difference between the values of $\theta_A$ and $\theta_C$, mod$\delta_{AC}$ may be computed as:

$$\mathrm{mod}\delta_{AC}=(\theta_A+360)-\theta_C. \quad (5)$$

Furthermore, a check is carried out at step 104 to verify whether the value of mod $\delta_{AC}$ is less than the value of $\delta_{AC}$. If the value of mod $\delta_{AC}$ is less than that of $\delta_{AC}$, then a zero-crossing boundary is located such that $\theta_C$ is situated to the left of the zero-crossing boundary, while $\theta_A$ and $\theta_B$ are positioned to the right of the zero-crossing boundary. In other words, the triangle occluded by the three vector pairs $(\theta_A,\phi_A)$, $(\theta_B,\phi_B)$, and $(\theta_C,\phi_C)$ "crosses" the zero-crossing boundary. Accordingly, the values of $\theta_A$ and $\theta_B$ may be adjusted by about 360 degrees at steps 106 and 108 respectively. In other words, the values of $\theta_A$ and $\theta_B$ are updated at steps 106 and 108 respectively as follows:

$$\theta_A=\theta_A+360 \quad (6)$$

$$\theta_B=\theta_B+360. \quad (7)$$

However, at step 104, if the value of mod $\delta_{AC}$ is greater than that of $\delta_{AC}$, then at step 110 the values of the three vector pairs $(\theta_A,\phi_A)$, $(\theta_B,\phi_B)$, and $(\theta_C,\phi_C)$ may be sorted by increasing values of $\theta$, resulting in vector pairs that may be denoted as $(\theta_1,\phi_1)$, $(\theta_2,\phi_2)$, and $(\theta_3,\phi_3)$. As previously noted, these three vector pairs $(\theta_1,\phi_1)$, $(\theta_2,\phi_2)$, and $(\theta_3,\phi_3)$ define the vertices of a "triangular" mask on the surface of the sphere 70. Accordingly, consequent to the sorting process depicted in steps 92-108, three vector pairs $(\theta_1,\phi_1)$, $(\theta_2,\phi_2)$, and $(\theta_3,\phi_3)$ arranged by increasing values of $\theta$ may be obtained.

Figure 7:
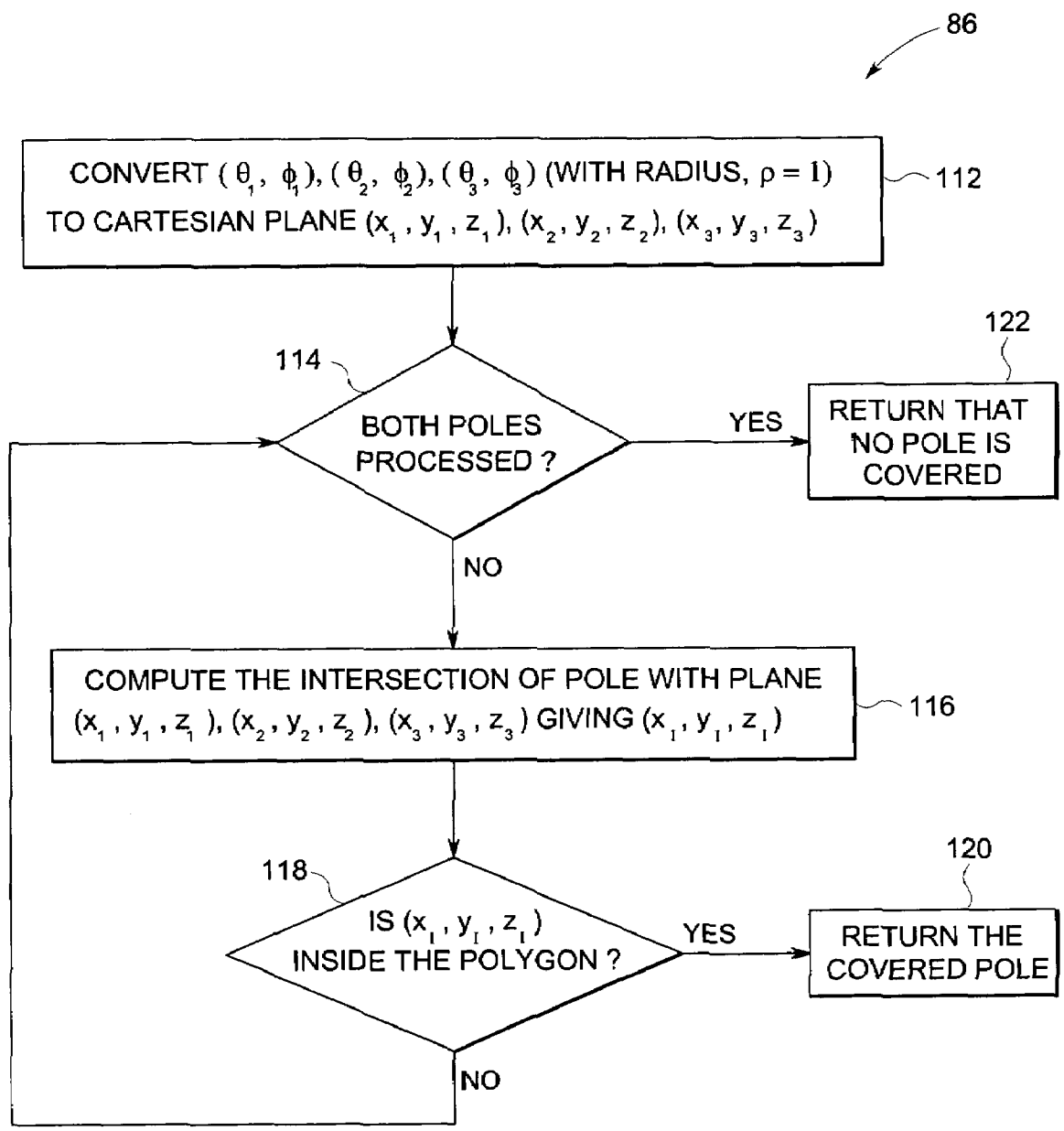
FIG. 7 is a flowchart illustrating a method for determining if a pole is covered for use in the method illustrated in FIG. 5, in accordance with aspects of the present technique.

FIG. 7 illustrates exemplary logic 86 for determining if the three vector pairs $(\theta_1,\phi_1)$, $(\theta_2,\phi_2)$, and $(\theta_3,\phi_3)$ cover a pole. Accordingly, the method includes determining where each pole vector intersects a plane defined by the triangle occluded by the three vector pairs $(\theta_1,\phi_1)$, $(\theta_2,\phi_2)$, and $(\theta_3,\phi_3)$. As previously noted, if the triangle occluded by the three vector pairs $(\theta_1,\phi_1)$, $(\theta_2,\phi_2)$, and $(\theta_3,\phi_3)$ covers a pole, additional computations may be necessary.

The method starts at step 112 where the three vector pairs $(\theta_1,\phi_1)$, $(\theta_2,\phi_2)$, and $(\theta_3,\phi_3)$ may be converted to their respective Cartesian coordinates. The respective Cartesian coordinates may be represented by $(x_1,y_1,z_1)$, $(x_2,y_2,z_2)$ and $(x_3,y_3,z_3)$. It should be noted that the radius $\rho$ is assumed to be equal to one.

Further, at step 114, a check is carried out to verify whether the triangle occluded by the three vector pairs $(\theta_1,\phi_1)$, $(\theta_2,\phi_2)$, and $(\theta_3,\phi_3)$ a covers a pole. As previously noted, the pole regions may be described as regions where $\phi=-90$ and $\phi=+90$. Further, a first pole "pole1" and a second pole "pole2" may be defined as:

$$\mathrm{pole1}=(0,0,1) \quad (8)$$

and $$\mathrm{pole2}=(0,0,-1). \quad (9)$$

Accordingly, at step 114 a pole, such as the first pole pole1, may be selected. Subsequently, at step 114, if it is determined that the first pole has not been processed, then at step 116 the intersection of the selected pole with the plane $(x_1,y_1,z_1)$, $(x_2,y_2,z_2)$ and $(x_3,y_3,z_3)$ may be computed resulting in a point of intersection generally denoted by $(x_1,y_1,z_1)$. Following step 116, a check is carried out to verify whether the point of intersection $(x_1,y_1,z_1)$ is located inside the triangle occluded by $(x_1,y_1,z_1)$, $(x_2,y_2,z_2)$ and $(x_3,y_3,z_3)$ at step 118. In certain embodiments, a winding method may be used to determine whether the point of intersection $(x_1,y_1,z_1)$ is located within the triangle. Alternatively, in some embodiments, a crossing method may also be employed to determine whether the point of intersection $(x_1,y_1,z_1)$ is situated within the triangle. Accordingly, if the point of intersection $(x_1,y_1,z_1)$ is located within the triangle, the covered pole may be returned at step 120. However, if the point of intersection $(x_1,y_1,z_1)$ does not lie within the triangle, then steps 116-118 may be repeated for the next pole, such as the second pole pole2. It should be appreciated that only one of the two poles may be covered. With returning reference to the decision block at step 114, if it is determined that neither the first pole pole1 nor the second pole pole2 is covered, then no pole is returned as indicated by step 122.

Figure 8:
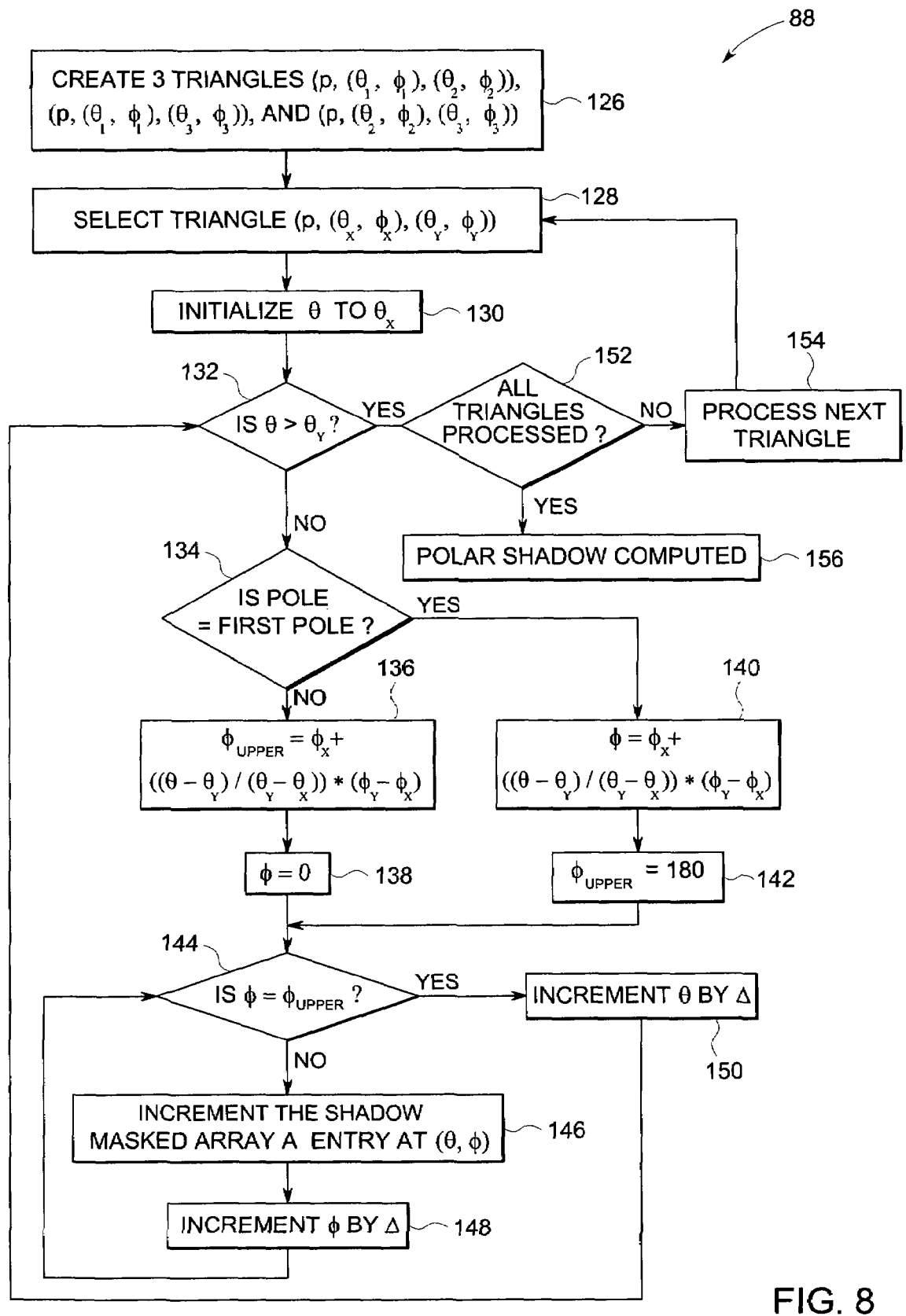
FIG. 8 is a flowchart illustrating a method for computing polar shadows for use in the method depicted in FIG. 5 in accordance with aspects of the present technique.

FIG. 8 illustrates exemplary logic 88 for computing a polar shadow mask. In other words a polar shadow mask is computed for pole p, where the pole p is either pole1 or pole2 as noted with reference to FIG. 7. The method begins at step 126, where three triangles are created. As will be appreciated, in the computation of the polar shadow mask, a pole p is situated within the triangle occluded by the three vector pairs $(\theta_1,\phi_1)$, $(\theta_2,\phi_2)$, and $(\theta_3,\phi_3)$. Three triangles may then be created by drawing a line from the position of the pole p to each of the three vertices of the triangle thereby resulting in three triangles. In one embodiment, the three triangles may be denoted by $(p,(\theta_1,\phi_1),(\theta_2,\phi_2))$, $(p,(\theta_1,\phi_1),(\theta_3,\phi_3))$ and $(p,(\theta_2,\phi_2),(\theta_3,\phi_3))$ respectively. Sub-dividing the triangle occluded by the three vector pairs $(\theta_1,\phi_1)$, $(\theta_2,\phi_2)$, and $(\theta_3,\phi_3)$ into three triangles represented by $(p,(\theta_1,\phi_1),(\theta_2,\phi_2))$, $(p,(\theta_1,\phi_1),(\theta_3,\phi_3))$ and $(p,(\theta_2,\phi_2),(\theta_3,\phi_3))$ advantageously facilitates reduction in complexity of computation of shadows cast as in the present arrangement each of the triangles $(p,(\theta_1,\phi_1),\theta_2,\phi_2))$, $(p,(\theta_1,\phi_1),(\theta_3,\phi_3))$ and $(p,(\theta_2,\phi_2),(\theta_3,\phi_3))$ does not cover a pole. Shadows cast by each of these three triangles may then be computed as will be described hereinafter.

Furthermore, at step 128, each of the three triangles $(p,(\theta_1,\phi_1),(\theta_2,\phi_2))$, $(p,(\theta_1,\phi_1),(\theta_3,\phi_3))$ and $(p,(\theta_2,\phi_2),(\theta_3,\phi_3))$ may be generally referred to as triangle $(p(\theta_x,\phi_x),(\theta_y,\phi_y))$, where $\theta_x$ may be $\theta_1$ or $\theta_2$, and $\theta_y$ may be $\theta_2$ or $\theta_3$. In a similar fashion, $\phi_x$ may be $\phi_1$ or $\phi_2$, and $\phi_y$ may be $\phi_2$ or $\phi_3$. Also, at step 128 a first triangle $(p,(\theta_x,\phi_x),(\theta_y,\phi_y))$ may be selected. For example, the selected first triangle may include the triangle $(p,(\theta_1,\phi_1),(\theta_2,\phi_2))$.

Subsequently, at step 130, the value of $\theta$ may be initialized to $\theta_x$. Further, at step 132, a check may be carried out to verify whether the value of $\theta$ is greater than the value of $\theta_y$. If the value of $\theta$ is less than the value of $\theta_y$, a check is carried out at step 134 to verify whether the pole p is a first pole pole1. Next, if the pole p is not the first pole pole1, in other words if the pole p is the second pole pole2, then at step 136 an upper bound on $\phi$ is computed as:

$$\phi_{upper} = \phi_X + \left(\frac{(\theta - \theta_Y)}{\theta_Y - \theta_X)}\right) * (\phi_Y - \phi_X). \tag{9}$$

Also, the value of $\phi$ is initialized to a value of zero (0) at step 138. However, if at step 134 it is determined that the pole p is the first pole pole1, then at step 140 the value of $\phi$ is computed as:

$$\phi = \phi_X + \left(\frac{(\theta - \theta_Y)}{(\theta_Y - \theta_X)}\right) * (\phi_Y - \phi_X). \tag{10}$$

Further, the upper bound on $\phi$, $\phi_{upper}$, is set to 180 at step 142. Subsequent to the computation of the upper bound of $\phi$ a check is carried out at step 144 to verify whether the value of $\phi$ is equal to the value of $\phi_{upper}$. If the value of $\phi$ is not equal to the value of $\phi_{upper}$, a shadow masked array entry at $(\theta,\phi)$ is incremented at step 146. Also, the value of $\phi$ is incremented by an amount substantially equal to the array granularity $\Delta$ at step 148. Steps 144-148 may then be repeated. With returning reference to the decision block at step 144, if the value of $\phi$ is equal to the value of $\phi_{upper}$, the value of $\theta$ is incremented by an amount substantially equal to the array granularity $\Delta$ at step 150. Furthermore, steps 132-150 may then be repeated. Additionally, referring to the decision block at step 132, if the value $\theta$ is greater than the value of $\theta_y$, a check is carried out at step 152 to verify whether all the triangles $(p,(\theta_1,\phi_1),(\theta_2,\phi_2))$, $(p,(\theta_1,\phi_1),(\theta_3,\phi_3))$ and $(p,(\theta_2,\phi_2),(\theta_3,\phi_3))$ have been processed. If it is determined at step 152 that all the triangles have not been processed, a subsequent triangle may be processed. In other words, steps 128-150 may be repeated for the subsequent triangle. However, if all of the triangles have been processed, it is indicative of the fact that the polar shadow has been computed as depicted by step 156.

Figure 9:
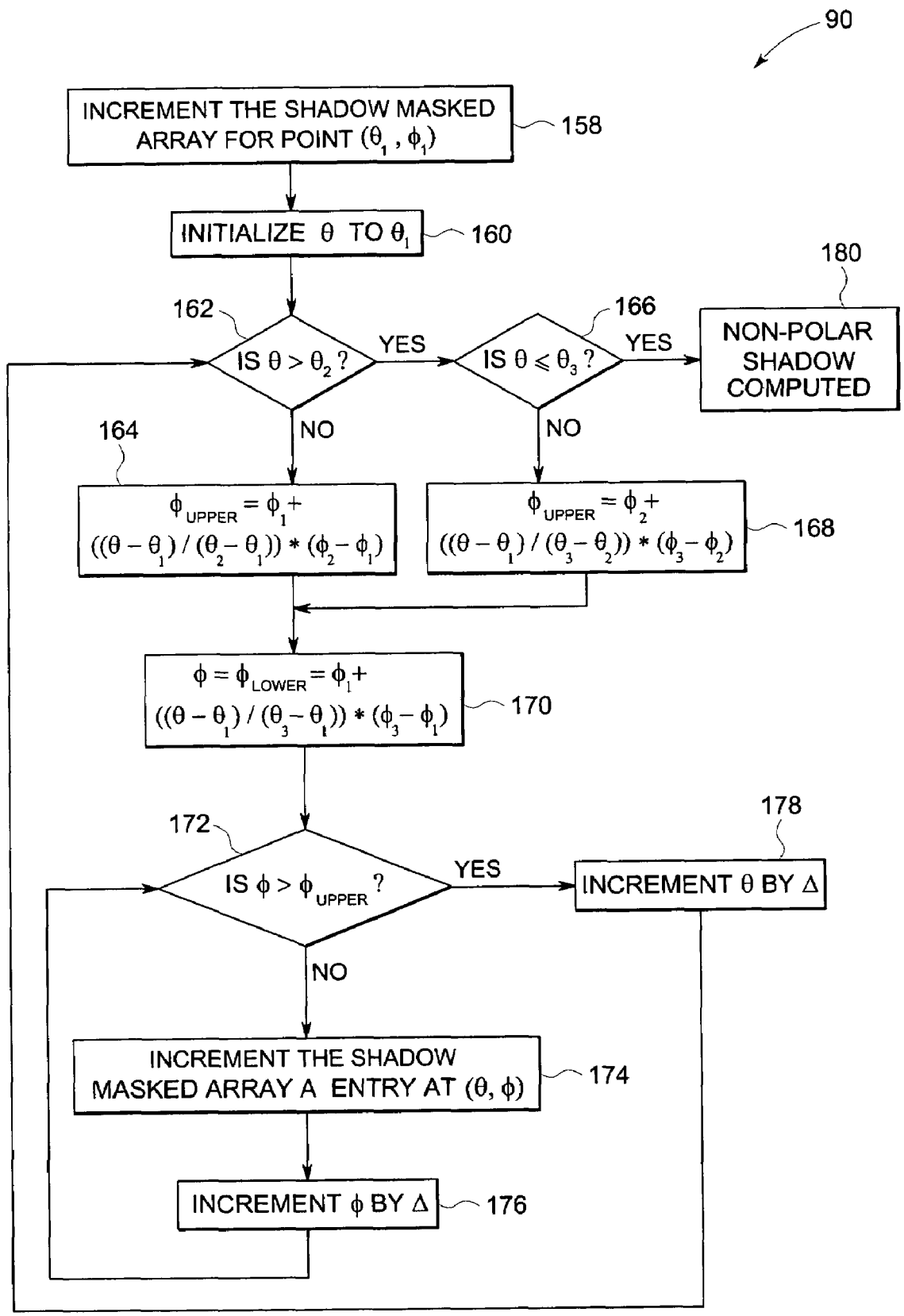
FIG. 9 is a flowchart illustrating a method for computing non-polar shadows for use in the method depicted in FIG. 5 in accordance with aspects of the present technique.

Turning now to FIG. 9, exemplary logic 90 for computing a non-polar shadow mask is depicted. The method begins at step 158 where the shadow masked array for point $(\theta_1,\phi_1)$ may be incremented. At step 160, the value of $\theta$ may be initialized to the value of $\theta_1$. Following step 160, a check is carried out at step 162 to verify whether the value of $\theta$ is greater than the value of $\theta_2$. If the value of $\theta$ is less than the value of $\theta_2$, an upper bound on $\phi$ is computed at step 164 using the following equation:

$$\phi_{upper} = \phi_1 + \left(\frac{(\theta - \theta_1)}{(\theta_2 - \theta_1)}\right) * (\phi_2 - \phi_1). \tag{11}$$

Moreover, if the value of $\theta$ is greater than the value of $\theta_2$, an additional check is carried out at step 166 to determine if the value of $\theta$ is less than or equal to the value of $\theta_3$. If the value of $\theta$ is greater than the value of $\theta_3$, then an upper bound on $\phi$ is computed at step 168 using the following equation:

$$\phi_{upper} = \phi_2 + \left(\frac{(\theta - \theta_1)}{(\theta_3 - \theta_2)}\right) * (\phi_2 - \phi_2). \tag{12}$$

In addition, a lower bound on $\phi$ is computed at step 170 and the value of $\phi$ is initialized to the computed value of $\phi_{lower}$. The value of $\phi_{lower}$ may be computed using the following equation:

$$\phi_{lower} = \phi_1 + \left(\frac{(\theta - \theta_1)}{(\theta_3 - \theta_1)}\right) * (\phi_3 - \phi_1) \tag{13}$$

Subsequently, at step 172, a check is made to verify whether the value of $\phi$ is greater than the value of $\phi_{upper}$. If the value of $\phi$ is less than the value of $\phi_{upper}$, then the shadow masked array entry at (θ,φ) is incremented at step 174. In other words, for each array entry contained between these lower and upper bounds on φ the array entry is incremented by one. Also, at step 176 the value of φ is incremented by an amount substantially equal to the value of the array granularity Δ. In addition, the process is looped through starting at step 172.

Returning to the decision block at step 172, if the value of φ is greater than the value of $φ_{upper}$, then the value of θ is incremented by an amount substantially equal to the value of the array granularity Δ at step 178. In addition, the process is looped through starting at step 162. It should be noted that the value of φ is looped from $φ_{lower}$ to $φ_{upper}$ incrementing φ by Δ. Consequently, a "shadow" is cast in the spherical coordinate space.

Additionally, with returning reference to the decision block at step 166, if the value of θ is less than or equal to the value of $θ_3$, it is indicative of completion of the computation of the non-polar shadow mask as depicted by step 180.

As will be appreciated by those of ordinary skill in the art, the foregoing example, demonstrations, and process steps may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, such as C++ or Java. Such code, as will be appreciated by those of ordinary skill in the art, may be stored or adapted for storage on one or more tangible, machine readable media, such as on memory chips, local or remote hard disks, optical disks (that is, CD's or DVD's), or other media, which may be accessed by a processor-based system to execute the stored code. Note that the tangible media may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

The various aspects of the method described hereinabove have utility in the automated generation of exploded view representations of three-dimensional part models for use by field service personnel for maintenance and service of products or machines in the field. Further, the technique is particularly advantageous in aiding in the initial assembly of machinery and also in future repair and maintenance by communicating viable directions of motion of each part in the assembly of parts with respect to the other parts in the assembly of parts.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A computer implemented method for generating an automated exploded view of an assembly of parts, comprising:
   determining at least one sequence of viable directions of motion of at least one moving part in the assembly of parts by creating a shadow masked array; and
   outputting the at least one sequence to a display, or a printer, or a combination thereof.

2. The method of claim 1, wherein the at least one moving part comprises a part selected for removal, insertion or replacement from the assembly of parts.

3. The method of claim 1, wherein the viable directions of motion of the moving part comprise a direction of motion where no collisions are generated when the moving part is removed from the assembly of parts.

4. The method of claim 1, wherein the step of determining comprises:
   selecting a moving part from the assembly of parts;
   creating the shadow masked away for the moving part, wherein the array comprises one or more points, and wherein each of the one or more points represents a direction of motion of the moving part with respect to the center of the assembly;
   selecting a stationary part from the assembly of parts, wherein the stationary part is different from the moving part; and
   processing the stationary part with respect to the moving part to generate one or more viable directions of motion of the moving part with respect to the stationary part.

5. The method of claim 4, wherein the shadow masked array represents the spherical coordinate space, wherein each of the points in the shadow masked array represents a vector direction, and wherein the size of the shadow masked away is determined based upon the number of vector directions.

6. The method of claim 4, wherein the step of processing comprises:
   selecting a first point on the moving part having one or more points;
   selecting a first polygon on the stationary part having one or more polygons;
   computing a shadow cast by each of the one or more polygons on a spherical plane with respect to the moving part;
   generating a masked array for each point in the moving part, wherein the masked away represents directions of motion of the moving part; and
   selecting an explosion direction for the moving part from the masked array, wherein the explosion direction comprises a direction of unimpeded motion of the moving part with respect to the assembly of parts.

7. The method of claim 6, wherein each of the one or more polygons comprises a triangle, or a square, or a rectangle, or a rhombus, or combinations thereof.

8. The method of claim 6, wherein computing step comprises:
   generating vectors for each point polygon pair;
   sorting the vectors to define vertices of a polygon mask on the surface of a sphere; and
   determining if the vectors cover a pole.

9. The method of claim 8, further comprising computing a polar shadow mask.

10. The method of claim 8, further comprising computing a non-polar shadow.

11. A computer implemented method for generating an automated exploded view of an assembly of parts, comprising:
   selecting a moving part from an assembly of parts, wherein the moving part comprises one or more points;
   selecting a stationary part from the assembly of parts, wherein the stationary part is different from the moving part, and wherein the stationary part comprises one or more polygons;

computing a shadow cast by the each of the one or more polygons on a spherical plane with respect to each point in the moving part;

generating a masked array for each point on the moving part, wherein the masked away represents directions of motion of the moving part; and outputting the masked array on a display, or a printer, or a combination thereof.

12. The method of claim 11, wherein computing step comprises:

generating vectors for each point polygon pair;

sorting the vectors to define vertices of a polygon mask on the surface of a sphere; and determining if the vectors cover a pole.

13. The method of claim 12, further comprising computing a polar shadow mask.

14. The method of claim 12, further comprising computing a non-polar shadow.

15. The method of claim 11, wherein the generating step further comprises generating a composite masked array by overlaying the masked array generated for each point on the moving part over one another, and wherein the composite masked away is representative of a grayscale image.

16. The method of claim 15, wherein each point in the composite masked away represents a union of part blocking information for a given direction of motion, and wherein the union of part blocking information represents information regarding blocking of the moving part by any other part in the assembly in the direction of motion represented by the respective point in the composite masked array.

17. The method of claim 15, further comprising identifying a direction of unimpeded motion of the moving part with respect to other parts in the assembly of parts.

18. The method of claim 17, wherein identifying a direction of unimpeded motion of the moving part comprises analyzing the grayscale image.

19. A computer implemented system, comprising:

one or more tangible media; and code disposed on the tangible media, wherein the code is adapted to determine at least one sequence of viable directions of motion of at least one moving part in an assembly of parts by creating a shadow masked array, and the code is adapted to output the at least one sequence to a display, or a printer, or a combination thereof.

20. The system of claim 19, wherein the code comprises:

code adapted to select a moving part from the assembly of parts, wherein the first part is a moving part;

code adapted to create the shadow masked array for the moving part, wherein the shadow masked array comprises one or more points, and wherein each of the one or more points represents a direction of motion of the moving part with respect to the center of the assembly;

code adapted to select a stationary part from the assembly of parts, wherein the stationary part is different from the moving part; and code adapted to process the stationary part with respect to the moving part to generate directions of motion of the moving part with respect to the stationary part.

21. The system of claim 20, wherein the code adapted to process the stationary part with respect to the moving part comprises:

code adapted to select a first point in the moving part having one or more points;

code adapted to select a first polygon on the stationary part having one or more polygons;

code adapted to compute a shadow cast by each of the one or more polygons on a spherical plane with respect to the moving part;

code adapted to generate a masked array for each point in the moving part, wherein the masked array represents directions of motion of the moving part; and code adapted to select an explosion direction for the moving part from the masked array, wherein the explosion direction comprises a direction of unimpeded motion of the moving part with respect to the assembly of parts.

22. A computer implemented system, comprising:

one or more tangible media; and code disposed on the tangible media, wherein the code comprises:

code adapted to select a moving part from an assembly of parts, wherein the moving part comprises one or more points;

code adapted to select a stationary part from the assembly of parts, wherein the stationary part is different from the moving part, and wherein the stationary part comprises one or more polygons;

code adapted to compute a shadow cast by the each of the one or more polygons on a spherical plane with respect to each point in the moving part;

code adapted to generate a masked array for each point in the stationary part, wherein the masked array represents directions of motion of the stationary part; and code adapted to output the masked array to a display, or a printer, or a combination thereof.

23. The system of claim 22, wherein the code adapted to generate a masked away further comprises code adapted to generate a composite masked away by overlaying the masked array generated for each point in the first part over one another, wherein the composite masked away is representative of a grayscale image.

24. The system of claim 22, further comprising code adapted to identify a direction of unimpeded motion of the moving part with respect to other parts in the assembly of parts.

25. A computer implemented system for generating an automated exploded view of an assembly of parts, comprising:

a pre-processor module configured to select a moving part from the assembly of parts, further configured to create shadow masked away for a selected moving part, wherein the shadow masked array comprises one or more points, wherein each of the one or more points represents a direction of motion of the moving part with respect to the center of the assembly, and further configured to select a stationary part different from the moving part;

a processing module configured to select a first point on the moving part having one or more points, further configured to select a first polygon on the stationary part having one or more polygons, further configured to compute a shadow cast by each of the one or more polygons on a spherical plane with respect to the moving part, further configured to generate a masked array for each point in the moving part, wherein the masked away represents directions of motion of the moving part, and further configured to select an explosion direction for the moving part from the masked array, wherein the explosion direction comprises a direction of unimpeded motion of the moving part with respect to the assembly of parts; and an operator console configured to display the generated exploded view of the assembly of parts.

26. The system of claim 25, comprising an acquisition module configured to acquire information regarding the assembly of parts.

27. The system of claim 25, wherein the operator console is configured to display the generated exploded view of the assembly of parts on a printer, or a display unit, or combinations thereof.

* * * * *